United States Patent
Blavat

(10) Patent No.: US 9,307,838 B1
(45) Date of Patent: Apr. 12, 2016

(54) FISHING ROD HOLDER

(71) Applicant: Michael A. Blavat, Marinette, WI (US)

(72) Inventor: Michael A. Blavat, Marinette, WI (US)

( * ) Notice: Subject to any disclaimer, the term of this patent is extended or adjusted under 35 U.S.C. 154(b) by 0 days.

(21) Appl. No.: 14/181,750

(22) Filed: Feb. 17, 2014

(51) Int. Cl.
*A47B 81/00* (2006.01)
*A01K 97/10* (2006.01)

(52) U.S. Cl.
CPC ............. *A47B 81/005* (2013.01); *A01K 97/10* (2013.01)

(58) Field of Classification Search
CPC .............................. A01K 97/10; A47B 81/005
USPC .............. 248/683, 520, 523, 537, 538, 205.5; 211/70.8, 64, 70.6, 89.01, 105.1, 60.1, 211/70.5; 43/21.2, 54.1, 26; 206/315.11
See application file for complete search history.

(56) References Cited

U.S. PATENT DOCUMENTS

| | | | | |
|---|---|---|---|---|
| 2,164,803 A * | 7/1939 | Duraffourg | ............... | 242/157 R |
| 2,288,442 A * | 6/1942 | Felton | ................... | A01K 97/10 15/210.1 |
| 2,467,251 A * | 4/1949 | Bowman | ................ | B60R 7/082 248/205.5 |
| 3,487,947 A * | 1/1970 | Bogar, Jr. | ............... | A01K 97/08 211/70.8 |
| 4,136,848 A * | 1/1979 | McCollum | ............. | A01K 97/08 248/205.6 |
| 5,078,279 A * | 1/1992 | Hancock | ............. | A47B 81/005 211/64 |
| 5,110,078 A * | 5/1992 | Gary | ....................... | F21S 4/001 248/206.2 |
| 5,402,974 A * | 4/1995 | Adams | ........................ | 248/205.5 |
| 5,441,224 A * | 8/1995 | Ludwig | .................. | G09F 13/28 248/74.2 |
| 5,560,138 A * | 10/1996 | Dentsbier | ............. | A01K 97/10 211/70.8 |
| 5,645,254 A * | 7/1997 | Ng et al. | .................... | 248/206.2 |
| 5,815,894 A * | 10/1998 | Soriano | .................. | A01K 97/08 24/297 |
| 5,915,572 A * | 6/1999 | Hancock | ........................ | 211/64 |
| 5,979,102 A * | 11/1999 | Sagryn | .................. | A01K 97/08 114/364 |
| 6,003,748 A * | 12/1999 | Rivenbark | ..................... | 224/319 |
| 6,446,850 B2 * | 9/2002 | Ming-Shun | ................... | 224/324 |
| 6,637,707 B1 * | 10/2003 | Gates et al. | ................ | 248/224.7 |
| 6,666,420 B1 * | 12/2003 | Carnevali | ............... | F16B 47/00 248/205.8 |
| 6,695,183 B2 * | 2/2004 | Hancock et al. | ............. | 224/401 |
| 6,793,109 B2 * | 9/2004 | Gates et al. | ................... | 224/401 |
| 6,896,228 B1 * | 5/2005 | Lu | .............................. | 248/205.8 |
| 7,229,059 B1 * | 6/2007 | Hood | ............................ | 248/518 |
| 7,337,934 B2 * | 3/2008 | Alling et al. | .................. | 224/401 |
| 7,503,459 B2 * | 3/2009 | Grayson | ...................... | 211/70.8 |
| 7,658,354 B2 * | 2/2010 | Wang | .............................. | 248/205.5 |
| 8,453,372 B1 * | 6/2013 | Moe | ................................ | 43/21.2 |
| 2004/0113041 A1 * | 6/2004 | Hancock et al. | ............. | 248/688 |
| 2006/0208142 A1 * | 9/2006 | Adams | .................... | F16B 45/00 248/206.2 |
| 2006/0243686 A1 * | 11/2006 | Grayson | ....................... | 211/70.6 |
| 2008/0073478 A1 * | 3/2008 | Gates et al. | ................... | 248/523 |
| 2011/0278406 A1 * | 11/2011 | Zhadanov | ............. | F16B 47/006 248/205.5 |
| 2012/0160791 A1 * | 6/2012 | Muldoon et al. | ................ | 211/64 |

* cited by examiner

*Primary Examiner* — Joshua Rodden
*Assistant Examiner* — Hiwot Tefera
(74) *Attorney, Agent, or Firm* — Donald J. Ersler

(57) ABSTRACT

A fishing rod holder preferably includes a rod holder base, a rod holder pad and a suction cup. The rod holder base includes a tubular body, a pair of attachment flanges and a pair of retention flanges. A U-shaped slot is formed in the tubular body. Each attachment flange extends outward from the tubular body. The pair of retention flanges terminate a top of the tubular body to retain the rod holder pad. The rod holder pad includes a rod hole, which communicates with a rod slot. The rod holder pad is retained in the tubular body. A suction cup hole is formed through each attachment flange to receive a fastener. The pair of suction cup holes are spaced apart to match the hole pattern of the suction cup. The tubular body is secured to the suction cup with a pair of fasteners.

3 Claims, 5 Drawing Sheets

FISHING ROD HOLDER

BACKGROUND OF THE INVENTION

1. Field of the Invention

The present invention relates generally to watercraft and more specifically to a fishing rod holder, which uses suction cups for securing a fishing rod to any suitable object, such as watercraft.

2. Discussion of the Prior Art

It appears that the prior art does not teach or suggest a fishing rod holder, which uses suction cups to secure a fishing rod to any object having a smooth and flat surface.

Accordingly, there is a clearly felt need in the art for a fishing rod holder, which uses suction cups for securing a fishing rod to any object having a smooth and flat surface, such as watercraft.

SUMMARY OF THE INVENTION

The present invention provides a fishing rod holder, which uses suction cups to secure a fishing rod to any suitable object. The fishing rod holder preferably includes a rod holder base, a rod holder pad and a suction cup. The rod holder base preferably includes a tubular body, a pair of attachment flanges and a pair of retention flanges. A U-shaped slot is formed through opposing sides of the tubular body. The U-shaped slot is substantially a length of the tubular body. Each attachment flange extends outward from the opposing sides of the tubular body, adjacent a bottom of the U-shaped slot. The pair of retention flanges terminate a top of the tubular body and extend inward toward each other to retain the rod holder pad.

The rod holder pad preferably includes a rod hole and a rod slot. The rod slot communicates with the rod hole for insertion of a fishing rod or the like into the rod holder pad. The rod holder pad is inserted into a bottom of the tubular body. A suction cup hole is formed through each attachment flange to receive a fastener. The pair of suction cup holes are spaced apart to match a distance between tapped holes in a cup base of the suction cup. The suction cup is preferably purchased from a manufacturer of suction cups. A pair of fasteners are used to attach the rod holder base to the cup base of the suction cup. In use, at least two fishing rod holders are secured to a flat surface of any object, such as a watercraft. A rod portion of a fishing rod is retained by the at least two fishing rod holders.

Accordingly, it is an object of the present invention to provide a fishing rod holder, which uses suction cups for securing a fishing rod to an object having a smooth and flat surface, such as a watercraft.

These and additional objects, advantages, features and benefits of the present invention will become apparent from the following specification.

DETAILED DESCRIPTION OF THE PREFERRED EMBODIMENTS

Figure 1:
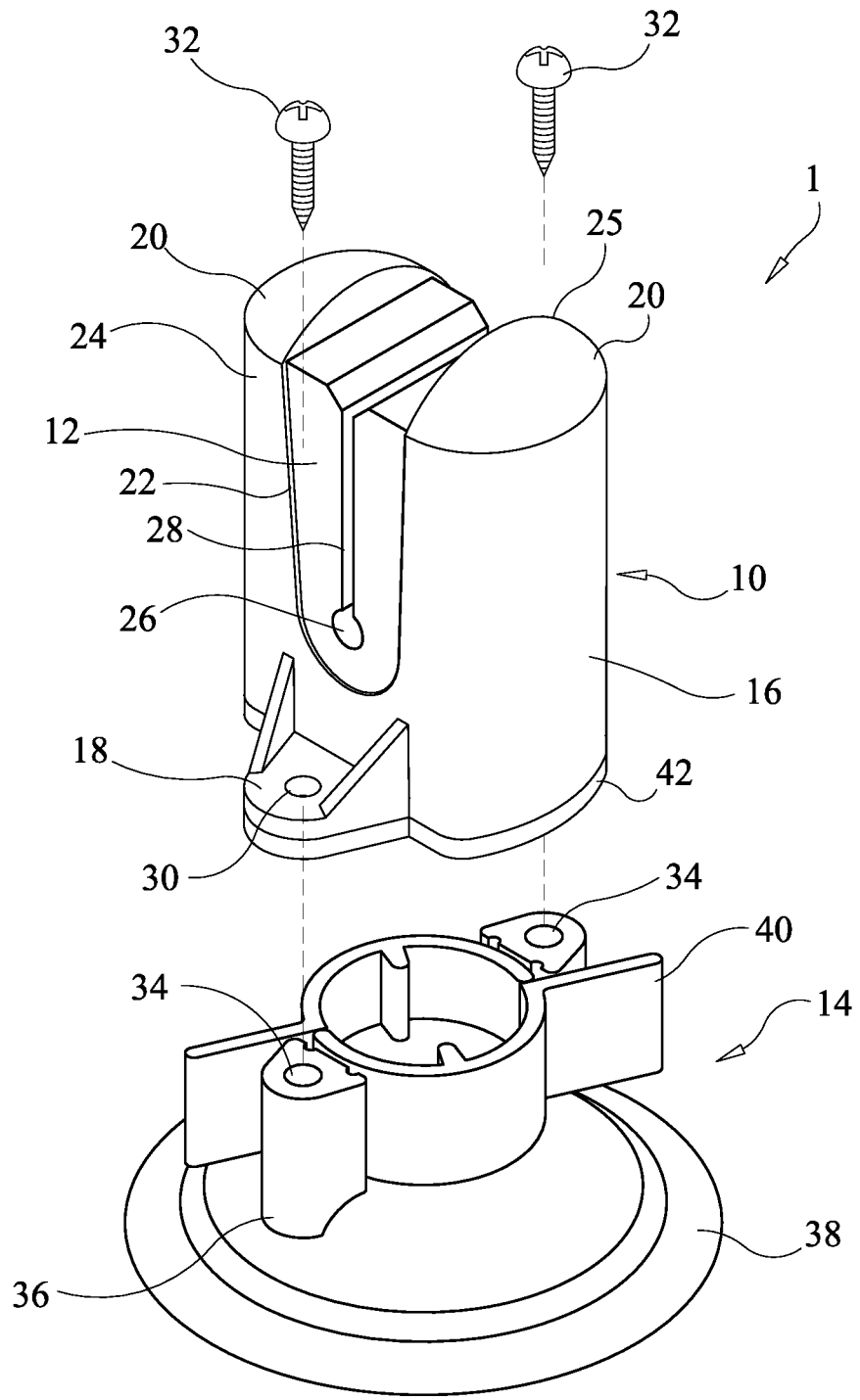
FIG. 1 is a partially exploded perspective view of a fishing rod holder in accordance with the present invention.
Figure 2:
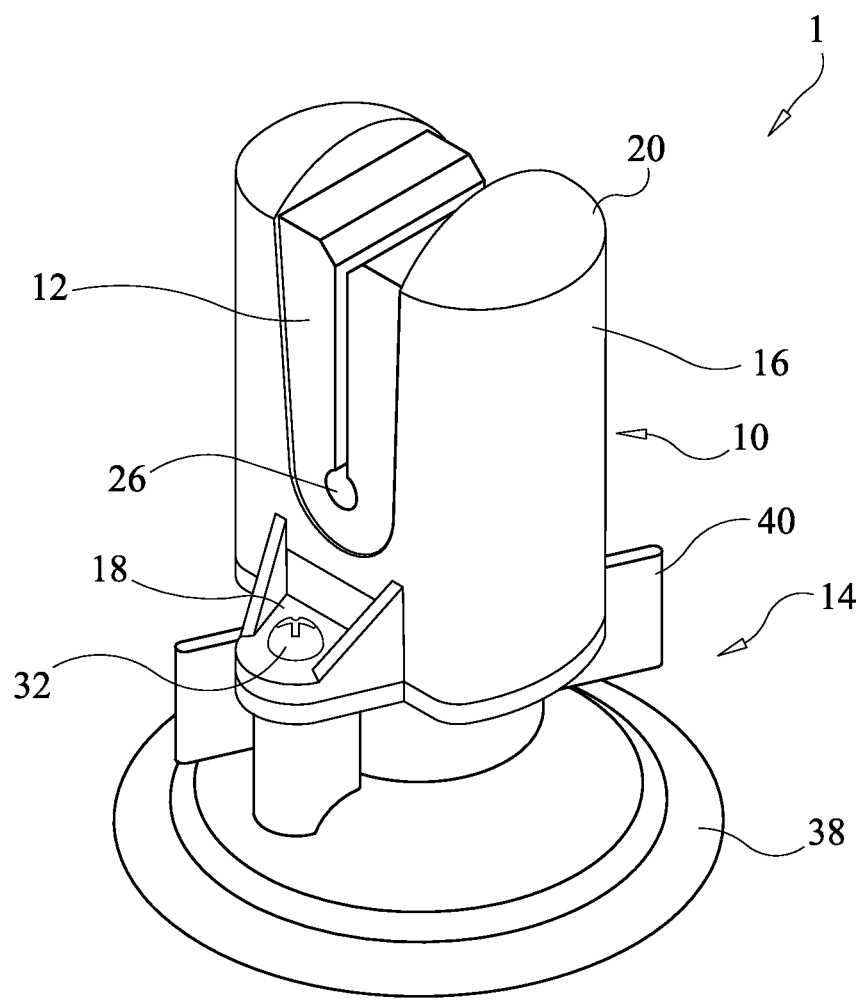
FIG. 2 is a perspective view of a fishing rod holder in accordance with the present invention.
Figure 3:
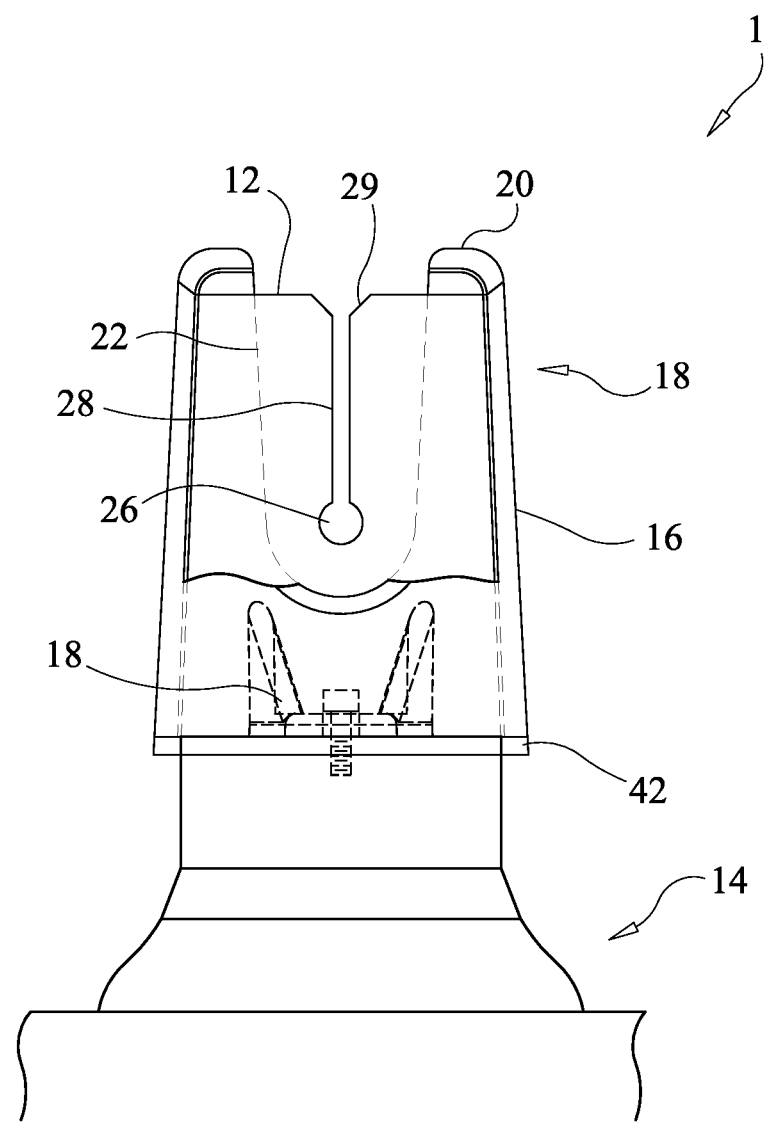
FIG. 3 is a side view of a fishing rod holder with a portion of the tubular body cutaway to show a rod holder pad in accordance with the present invention.
Figure 4:
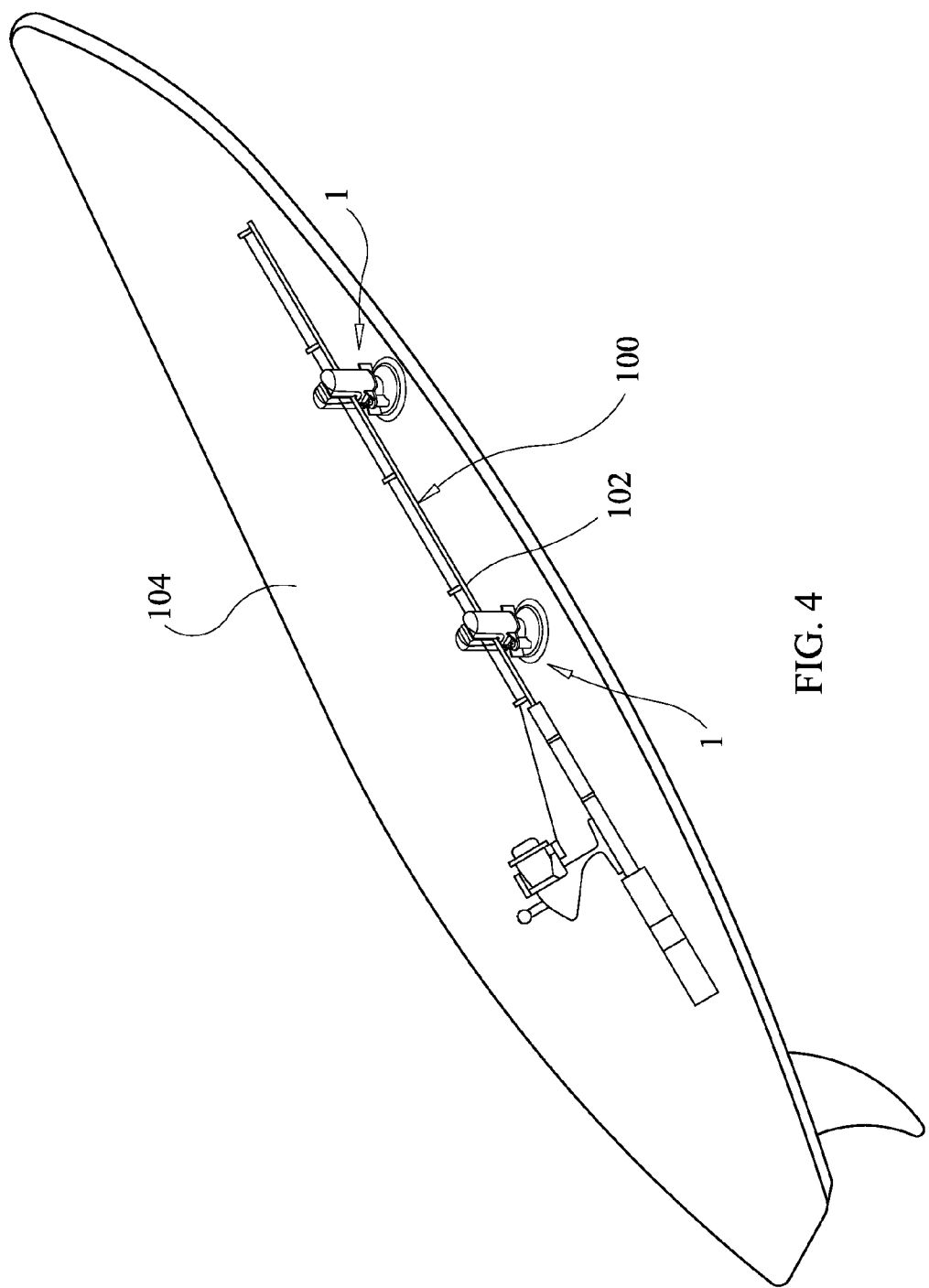
FIG. 4 is a perspective view of two fishing rod holders attached to a waterboard to retain a fishing rod in accordance with the present invention.

With reference now to the drawings, and particularly to FIG. 1, there is shown a partially exploded perspective view of a fishing rod holder 1. With reference to FIGS. 2-3, the fishing rod holder 1 includes a rod holder base 10, a rod holder pad 12 and a suction cup 14. The rod holder base 10 includes a tubular body 16, a pair of attachment flanges 18 and a pair of retention flanges 20. A U-shaped slot 22 is formed through opposing sides 24 of the tubular body 16. With reference to FIG. 4, the U-shaped slot 22 has a width that is at least twice the width of a rod portion 102 of a fishing rod 100. The U-shaped slot 22 extends substantially a length of the tubular body 16. Each attachment flange 18 extends outward from the opposing sides 24, 25 of the tubular body 16, adjacent a bottom of the U-shaped slot 22. The pair of retention flanges 20 terminate a top of the tubular body 16 and extend inward toward each other to retain the rod holder pad 12. The tubular body 16 is preferably fabricated from a molded plastic material, but other suitable materials may also be used.

Figure 5:
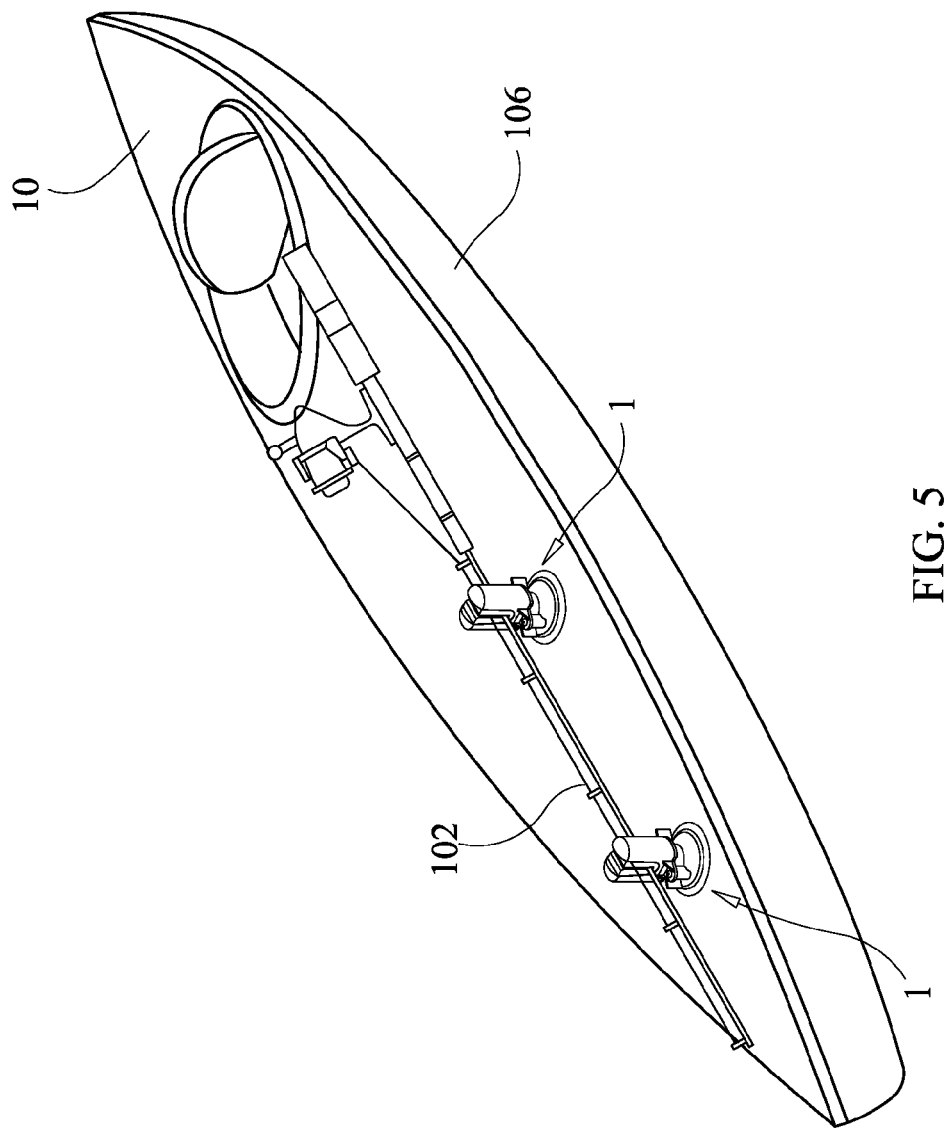
FIG. 5 is a perspective view of two fishing rod holders attached to a kayak to retain a fishing rod in accordance with the present invention.

With reference to FIGS. 4-5, the rod holder pad 12 preferably includes a rod hole 26 and a rod slot 28. The rod slot 28 communicates with the rod hole 26 for insertion of the rod portion of the fishing rod 100 or the like into the rod hole 26 of the rod holder pad 12. Material is preferably removed from an entrance of the rod slot 28, preferably in the form of a pair of chamfers 29 to facilitate insertion of the rod portion 102. The rod holder pad 12 is preferably fabricated from a resilient foam material, but other suitable materials may also be used. A suction cup hole 30 is formed through each attachment flange 18 to receive a fastener 32. The pair of suction cup holes 30 are spaced apart to match a distance between tapped holes 34 in the suction cup 14. The suction cup 14 preferably includes a cup base 36, a suction cup portion 38, a lock lever 40 and a cover pad 42. The tapped holes 34 are formed in the cup base 36. The lock lever 40 is rotated to lock the suction cup portion 38 to a flat surface. The suction cup 14 is preferably purchased from a manufacturer of suction cups. Suction cups are well known in the art and need not be explained in further detail. The pair of fasteners 32 are used to attach the rod holder base 10 to the cup base 36 of the suction cup 14.

In use, at least two fishing rod holders 1 are secured to a flat surface of an object. The rod portion 102 of the fishing rod 100 is retained in the rod hole 26 of the fishing rod holder 1. With reference to FIG. 4, the rod portion 102 of the fishing rod 100 is secured to a waterboard 104 with two fishing rod holders 1. With reference to FIG. 5, the rod portion 102 of the fishing rod 100 is secured to a kayak 106 with two fishing rod holders 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A fishing rod holder comprising:

a rod holder base includes a tubular body and a pair attachment flanges, said pair of attachment flanges extend from opposing sides of said tubular body at a bottom thereof, a substantially U-shaped slot is formed through said opposing sides, a pair of retention flanges terminate a top of said tubular body;

a rod holder pad includes a rod slot and a rod hole, said rod slot is sized to retain a rod portion of a fishing rod, a bottom of said rod slot is terminated with said rod hole, a length of said rod slot is greater than a diameter of said rod hole, an outer perimeter of said rod holder pad is retained in an inner perimeter of said tubular body, wherein said rod base holder is vertically retained in said tubular body under said pair of retention flanges; and a suction cup is attached directly to a bottom of said pair of attachment flanges, wherein the rod portion of the fishing rod is retained in said rod holder pad, said suction cup is secured to a flat surface.

2. A fishing rod holder comprising:

a rod holder base includes a tubular body and a pair attachment flanges, said pair of attachment flanges extend from opposing sides of said tubular body at a bottom thereof, a substantially U-shaped slot is formed through said opposing sides, a pair of retention flanges terminate a top of said tubular body;

a rod holder pad includes a rod slot and a rod hole, said rod slot is sized to retain a rod portion of a fishing rod, a bottom of said rod slot is terminated with said rod hole, a length of said rod slot is greater than a diameter of said rod hole, material is removed from an entrance of said rod slot to facilitate insertion of the rod portion, an outer perimeter of said rod holder pad is retained in an inner perimeter of said tubular body, wherein said rod base holder is vertically retained in said tubular body under said pair of retention flanges; and a suction cup is attached directly to a bottom of said pair of attachment flanges, wherein the rod portion of the fishing rod is retained in said rod holder pad, said suction cup is secured to a flat surface.

3. A fishing rod holder comprising:

a rod holder base includes a tubular body and a pair attachment flanges, said pair of attachment flanges extend from opposing sides of said tubular body at a bottom thereof, a substantially U-shaped slot is formed through said opposing sides, a width of said substantially U-shaped slot is at least twice a width of the rod portion, a pair of retention flanges terminate a top of said tubular body;

a rod holder pad includes a rod slot and a rod hole, said rod slot is sized to retain a rod portion of a fishing rod, a bottom of said rod slot is terminated with said rod hole, a length of said rod slot is greater than a diameter of said rod hole, an outer perimeter of said rod holder pad is retained in an inner perimeter of said tubular body, wherein said rod base holder is vertically retained in said tubular body under said pair of retention flanges; and a suction cup is attached directly to a bottom of said pair of attachment flanges, wherein the rod portion of the fishing rod is retained in said rod holder pad, said suction cup is secured to a flat surface.

* * * * *